United States Patent [19]
Mogaki

[11] Patent Number: 6,161,158
[45] Date of Patent: *Dec. 12, 2000

[54] BUS ARBITRATION APPARATUS AND METHOD WHEREIN EACH MODULE HAS TWO IN-MODULE ARBITERS

[75] Inventor: Yasuo Mogaki, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/056,850

[22] Filed: Apr. 8, 1998

[30] Foreign Application Priority Data

Apr. 25, 1997 [JP] Japan ................................. 9-122924

[51] Int. Cl.$^7$ ............................................. G06F 13/368
[52] U.S. Cl. ............................................................. 710/119
[58] Field of Search .................................... 710/119, 107, 710/125, 126

[56] References Cited

U.S. PATENT DOCUMENTS

| | | |
|---|---|---|
| 4,837,682 | 6/1989 | Culler . |
| 5,101,482 | 3/1992 | Kipnis ................................. 710/118 |
| 5,168,569 | 12/1992 | Tahira et al. ......................... 395/725 |
| 5,459,840 | 10/1995 | Isfeld et al. .......................... 710/129 |
| 5,535,341 | 7/1996 | Shah et al. ........................... 710/126 |
| 5,555,383 | 9/1996 | Elazar et al. ......................... 710/126 |
| 5,572,687 | 11/1996 | Alnuweiri ............................ 710/123 |
| 5,680,592 | 10/1997 | Priem .................................. 395/527 |
| 5,706,446 | 1/1998 | Kalish et al. ........................ 710/113 |
| 5,761,450 | 6/1998 | Shah ..................................... 710/107 |

FOREIGN PATENT DOCUMENTS

| | | |
|---|---|---|
| 3-011449 | 1/1991 | Japan . |
| 3-11449 | 1/1991 | Japan . |
| 4-096165 | 3/1992 | Japan . |
| 4-96165 | 3/1992 | Japan . |
| 6-124205 | 5/1994 | Japan . |
| 8-095904 | 4/1996 | Japan . |
| 8-95904 | 4/1996 | Japan . |

*Primary Examiner*—Glenn A. Auve
*Attorney, Agent, or Firm*—Foley & Lardner

[57] ABSTRACT

By doubling an arbitration circuit for bus access command to be requested to a bus, the number of bus cycles occupied per one bus access command is reduced by one cycle to allow the bus to be operated at high speed. A first in-module arbiter selects a bus access command having the highest priority to be issued to the bus, and a second in-module arbiter selects the bus access command having the highest priority excepting the bus access command previously requested last time by the one module. If the module had already acquired the bus last time, then the result of the second in-module arbiter is selected as a current bus access command. On the other hand, if the module did not acquire the bus last time, then the result of the first in-module arbiter is selected as a current bus access command.

10 Claims, 5 Drawing Sheets

BUS ARBITRATION APPARATUS AND METHOD WHEREIN EACH MODULE HAS TWO IN-MODULE ARBITERS

BACKGROUND OF THE INVENTION

1. Field of the Invention

The present invention relates to a system having a plurality of modules connected through a common bus. In particular, the present invention relates to a method and apparatus for arbitration in a system that performs in-module arbitration such that the respective modules select one bus access command out of a plurality of bus access commands in this module, and which performs arbitration of a request on the bus in a distributed arbitration system.

2. Description of the Related Art

In a system in which respective modules perform arbitration of bus access commands for bus-requesting output from a plurality of modules, so as to acquire the bus consecutively, each respective module is required to perform arbitration of a bus access command to be requested next by the respective module after confirming the arbitration result on the bus of a bus request made by the respective module just prior to the present bus request. Depending on whether the result of the bus request is successful or unsuccessful, it is determined whether in-module arbitration is performed excluding the bus access command selected previously, or whether in-module arbitration is performed including the bus access command selected previously.

Heretofore, for a short cycle, it has been impossible to perform both bus arbitration and in-module arbitration in the same cycle, and both arbitrations require one cycle respectively, that is, total two cycles are needed. Therefore, the number of cycles required to issue one bus access command takes a long time, which is a problem. The conventional art is described hereinbelow.

The structure of the conventional art relating to in-module arbitration is shown in FIG. 4. In FIG. 4, the structure of one module 0 is shown, and other modules have the same structure. As shown in FIG. 4, the module 0 has a bus arbiter 306 for performing arbitration of a request on a bus and an in-module arbiter 302 for performing arbitration of a bus access command to be requested next by the involving module using the result of the previous request. A bus access command storage queue group 301 stores a plurality of bus access commands that this module is ready for requesting to the bus. For example, bus access command storage queue group 301 may include a plurality of FIFOs and/or registers, with each one being assigned a particular priority level and receiving bus access commands from a particular unit or element.

The in-module arbiter 302 selects the bus access command having the highest priority out of the bus access commands 313 in the bus access command storage queue group 301. However, if acquisition of the bus by this module is informed to this module by way of the bus WIN signal 312, then the bus access command selected previously is not selected.

The bus access command selected by the in-module arbiter 302 is stored in the request register 303. The request signal generating section 305 outputs a request including type of the bus access command stored in the request register 303 to the request line 304 that corresponds to this module, and which is output to all the modules on the bus. Request INPUT registers 307 to 309 are served for storing bus requests from all the modules on the bus including this module. The bus arbiter 306 selects the module that requests the bus access command having the highest priority as a bus WINNER. If the request of this module is selected, then the bus arbiter 306 asserts the bus WIN signal 310. The bus WIN signal storage register 311 receives and stores the bus WIN signal 310. In the case that a module is structured using a high speed operative LSI, it is impossible to perform bus arbitration and in-module arbitration in the same one cycle, therefore, a bus WIN storage register is needed for receiving temporarily the bus WIN signal.

The bus access command stored in the bus access command register 304 is outputted from the bus driving section 318 to the common bus 317 when the bus WIN signal 310 is asserted, and the issuance of the bus access command to the bus is completed.

A time chart for representing the bus condition in the conventional art is shown in FIG. 5. In the timing 1, the bus access command requested by the module to the bus is stored in the request register 303. Also in the timing 1, the request line 314 is asserted and the bus request is informed to all the modules on the bus. In the timing 2, the respective modules store the bus request in the request INPUT registers 307 to 309 to perform bus arbitration, and determine the bus WINNER. The bus access command in the bus access command register 304 is outputted to the bus as an ENB (enable) signal if this module has acquired the bus. In the timing 3, the bus WIN signal storage register 311 stores the bus WIN signal 310. The in-module arbiter 302 performs arbitration of the bus access command for a next bus request with reference to the value of the bus WIN signal storage register 311 in the timing 3.

In the prior art, it is required to send the bus WIN signal from the bus arbiter 306 to the in-module arbiter 302. However, in a high speed operative LSI, the in-module arbiter 302 cannot directly use the signal supplied from the bus arbiter 306, but it is required to use the signal through a one-step FF (bus WIN signal register 311). Because the bus arbiter 306 involves complex logic for performing arbitration of requests from the respective modules and also the in-module arbiter 302 involves complex logic for performing arbitration of the bus access command in the module, it is impossible to use directly the signal that has passed through the logic of the bus arbiter 306 for the in-module arbiter 302. Therefore, a one-step FF (bus WIN signal storage register 311) is necessary to be provided for supplying the bus WIN signal from the bus arbiter 306 to the in-module arbiter 302. As a result, the number of cycles required for possessing of one bus access command increases by one, and the bus access command processing capacity of the bus decreases, thereby causing a problem.

SUMMARY OF THE INVENTION

It is an object of the present invention to improve a bus access command processing capacity of a bus by reducing the number of cycles required for bus arbitration.

To achieve the above-mentioned object, the arbitration method of the present invention involves a method for arbitration performed in a system in which a plurality of modules are connected to a common bus of a distributed arbitration system, and the respective modules perform issue request to the bus by arbitrating one bus access command out of a plurality of effective bus access commands internally, wherein arbitration is performed using simultaneously both a first arbiter circuit for selecting one bus access command out of effective bus access commands in the module, and a second arbiter circuit for selecting one bus access command out of bus access commands excepting the bus access command that this module made an issue request for last time to the bus out of effective bus access commands in the module, and the module selects a bus access command selected by the second arbiter circuit if this module acquired the bus last time, on the other hand, selects a bus access command selected by the first arbiter circuit if this module did not acquire the bus last time, to perform issue request to the bus.

Further, to achieve the above-mentioned object, the device for arbitration of the present invention comprises a first arbiter circuit for selecting one bus access command out of a plurality of bus access commands in the one module and a bus arbiter for performing bus arbitration of distributed arbitration system after outputting all the bus requests sent out from this module and other modules. The device for arbitration also comprises a second arbiter circuit for selecting one bus access command out of bus access commands excepting the bus access commands that this module made an issue request for last time to the bus out of effective bus access commands in the module. The device for arbitration further comprises a selector for inputting the bus WIN signal outputted from the bus arbiter as a selection control signal, and selecting the bus access command selected by the second arbiter circuit if this module acquired the bus last time or, on the other hand, selecting the bus access command selected by the first arbiter circuit if this module did not acquire the bus last time. The device for arbitration also comprises a request register for holding the bus access command selected by the selector. The device for arbitration still further comprises a request signal generation section for performing issue request for the bus access command held in the request register to the bus.

In the method and apparatus for arbitration of the present invention, arbitration is performed using simultaneously both a first arbiter circuit for selecting one bus access command out of effective bus access commands in the module, and a second arbiter circuit for selecting one bus access command out of bus access commands excepting the bus access command that this module made an issue request for last time to the bus out of effective bus access commands in the module. The module selects a bus access command selected by the second arbiter circuit if this module acquired the bus last time, or, on the other hand, selects a bus access command selected by the first arbiter circuit if this module did not acquire the bus last time, to perform issue request to the bus. Thereby, both in-module arbitration and bus arbitration are performed in the same one cycle.

BRIEF DESCRIPTION OF THE DRAWINGS

The above-mentioned objects and advantages of the invention will become more apparent from the following detailed description when read in conjunction with the accompanying drawings, with like reference numerals indicating corresponding parts throughout, and wherein.

DETAILED DESCRIPTION OF THE PREFERRED EMBODIMENT

Next, an embodiment of the present invention will be described hereinafter in detail with reference to the drawings.

Figure 1:
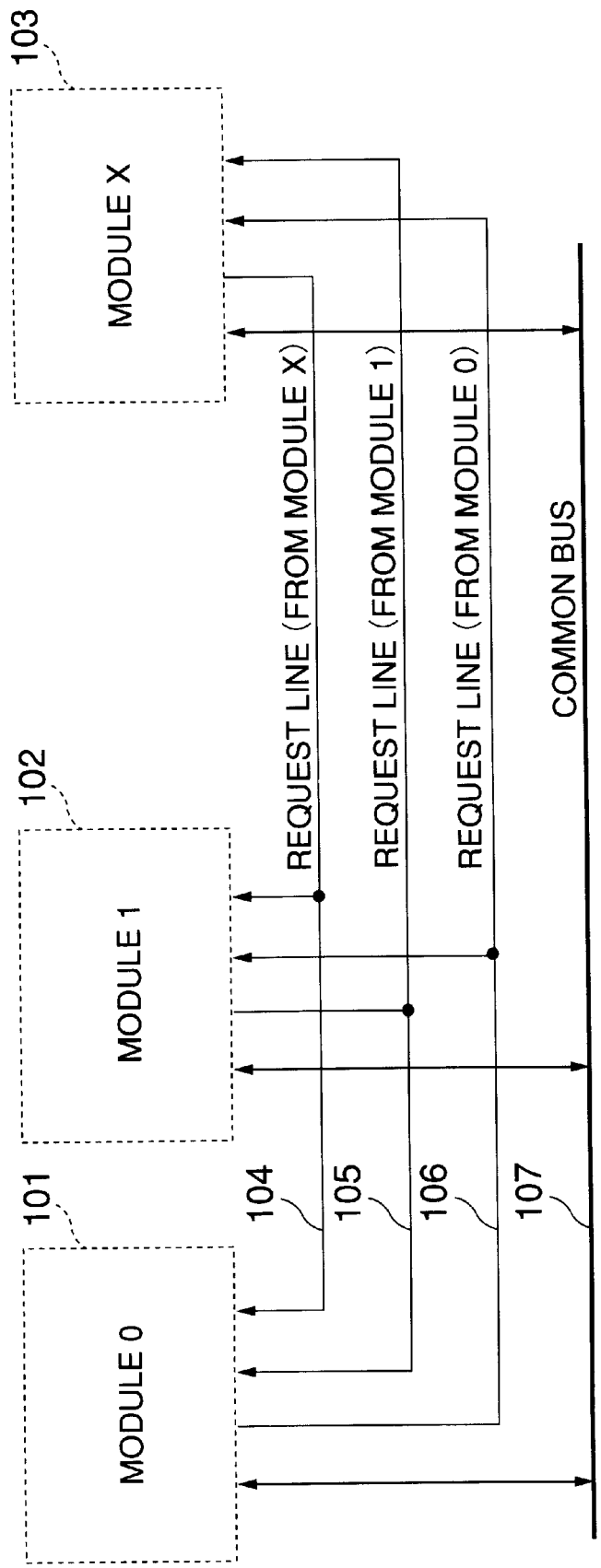
FIG. 1 is a block diagram for illustrating an exemplary structure of a system to which the present invention is applied.

An example of the structure of a system to which the present invention is applied is shown in FIG. 1. Modules 101 to 103 in the drawing are connected commonly to the common bus 107. The respective modules are connected with request lines 104 to 106 on a one-to-one basis to the respective modules. An acquisition request for acquiring the common bus 107 from the respective modules is informed to all the modules 101 to 103 on the bus through the request lines 104 to 106. The information informed through the request lines 104 to 106 includes the type of a requested bus access command, and this information is used for bus arbitration in the respective modules. The bus arbitration system used in the embodiment is a distributed arbitration system. The respective modules 101 to 103 determine the WINNER using a bus arbiter in the module described hereinafter. Only the module that recognizes that the module itself is the WINNER uses the common bus 107. The common bus 107 comprises, for example, one or more data lines, one or more address lines, and/or one or more control lines.

A bus interface device using a LSI provided between the common bus 107 and a respective CPU (not shown), which is a component of a multi-processor system, is an operative example of the respective modules 101 to 103.

Figure 2:
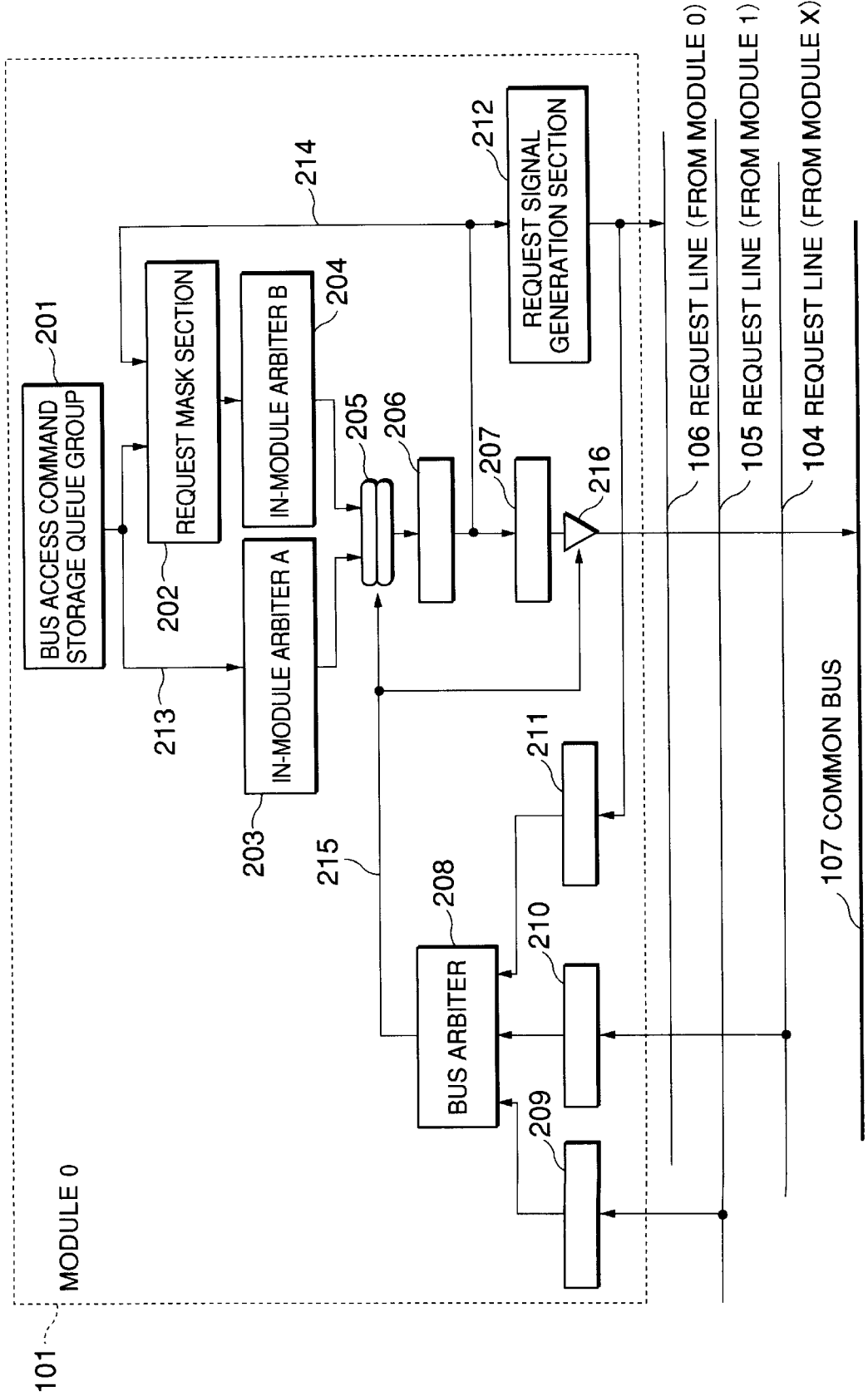
FIG. 2 is a block diagram for illustrating the structure of one embodiment of the present invention relating to arbitration in a module.

The structure of one embodiment of the present invention relating to in-module arbitration is shown in FIG. 2. In FIG. 2, merely one module 0 is shown, and other modules have the same structure.

In FIG. 2, a bus access command that is ready for being requested to a bus is stored in a bus access command storage queue group 201. In the case that the module 101 is a bus interface device of a CPU (not shown), the bus access command outputted from the CPU is stored in the bus access command storage queue group 201. The bus access command stored in the bus access command storage queue group 201 is supplied to a subsequent in-module arbiter A 203 and a request mask section 202 as a bus access command 213.

The bus access command is categorized into one of a read command and a write command. The read command is further categorized into either a block read command for taking an access to a memory, or a register read command for taking an access to a register. Similarly, the write command is categorized further into one of a block write command and a register write command. A write command is accompanied by write data.

The in-module arbiter A 203 selects one bus access command out of bus access commands stored in the bus access command storage queue group 201. The selected bus access command is the bus access command having the highest priority to be issued to the bus among bus access commands stored in the bus access command storage queue group 201. The issue priority order is determined based on the type of the bus access command. For example, a prescribed priority reference has been determined previously.

A request mask section 202 functions to mask the bus access command just previously requested by this module, with respect to the bus access commands stored in the bus access command storage queue group 201. In other words, the request mask section 202 supplies all the bus access commands to the in-module arbiter B 204 excepting the bus access command 214 held in the request register 206 out of the bus access commands stored in the bus access command storage queue group 201.

The in-module arbiter B 204 selects one bus access command out of bus access commands supplied from the request mask section 202. The bus access command to be selected is the bus access command having the highest priority for being issued to the bus, as in the case of the in-module arbiter A 203. The issue priority is determined based on the type of bus access command as in the case of the in-module arbiter A 203.

The selector 205 is operative to select the bus access command selected by the in-module arbiter A 203 if this module was not the bus WINNER last time, or, on the other hand, to select the bus access command selected by the in-module arbiter B 204 if this module was the bus WINNER last time. The determination as to whether this module was the bus WINNER is judged using the bus WIN signal 215. The request register 206 stores the result outputted from the selector 205. The request signal generation section 212 outputs the request including the bus access command type stored in the request register 206 to all the modules on the bus using the request line 106. As a result, a bus access command that has been completely issued already as a consequence of a previous bus request by this module and following acquisition of the bus will not be requested again, but instead a bus access command having a second highest priority is subsequently requested to the bus.

A request from the respective modules on the bus is stored in the request INPUT registers 209 to 211. The bus arbiter 208 in each module performs arbitration between all the modules on the bus using the information of the request INPUT registers 209 to 211. That is, the module that requests the bus access command of the type having the highest priority is selected as the bus WINNER. In the present invention, arbitration of the common bus 107 by the bus arbiter 208 is performed in a distributed arbitration system in all of the modules, and the bus arbitration result in all the modules is the same. The bus arbiter 208 of a module asserts the bus WIN signal 215 if that module is the WINNER. The bus access command stored in the request register 206 is transferred to the bus access command register 207. When the bus WIN signal is asserted, the bus access command stored in the bus access command register 207 is outputted to the common bus 107 by the bus driving section 216, and a bus driving is performed corresponding to the bus access command.

Figure 3:
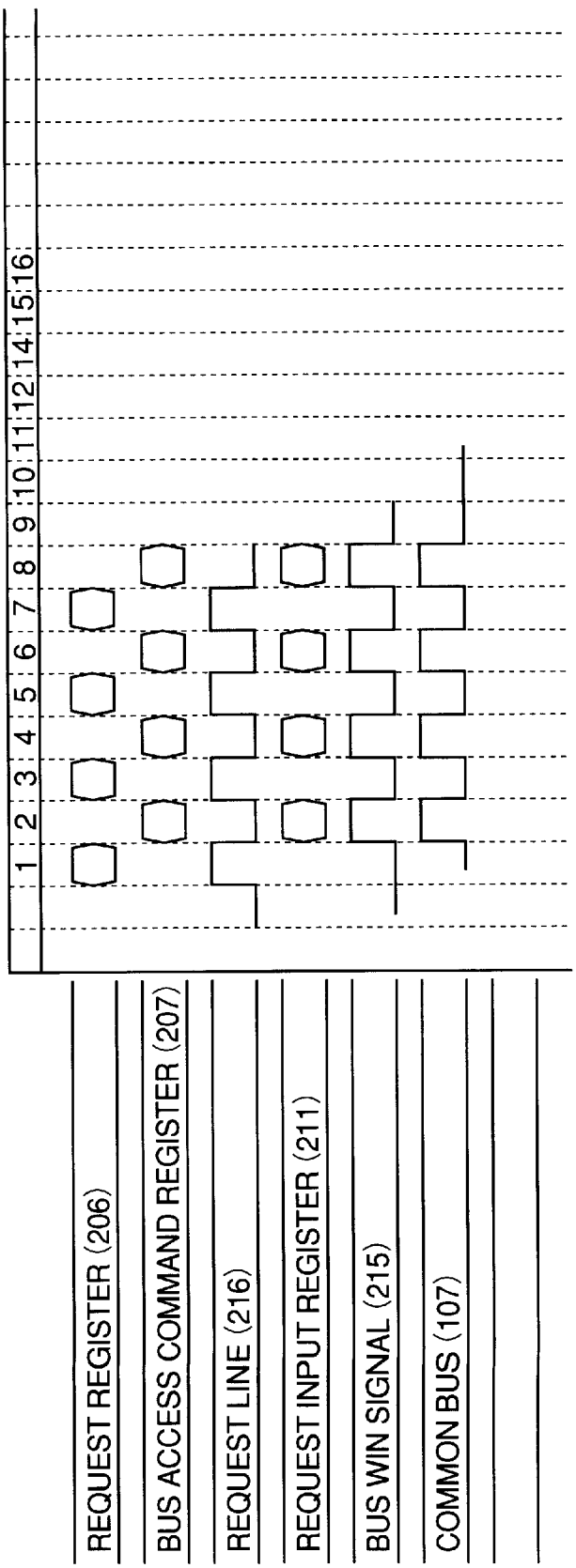
FIG. 3 is a time chart for illustrating the bus condition in the embodiment of the present invention.
Figure 4:
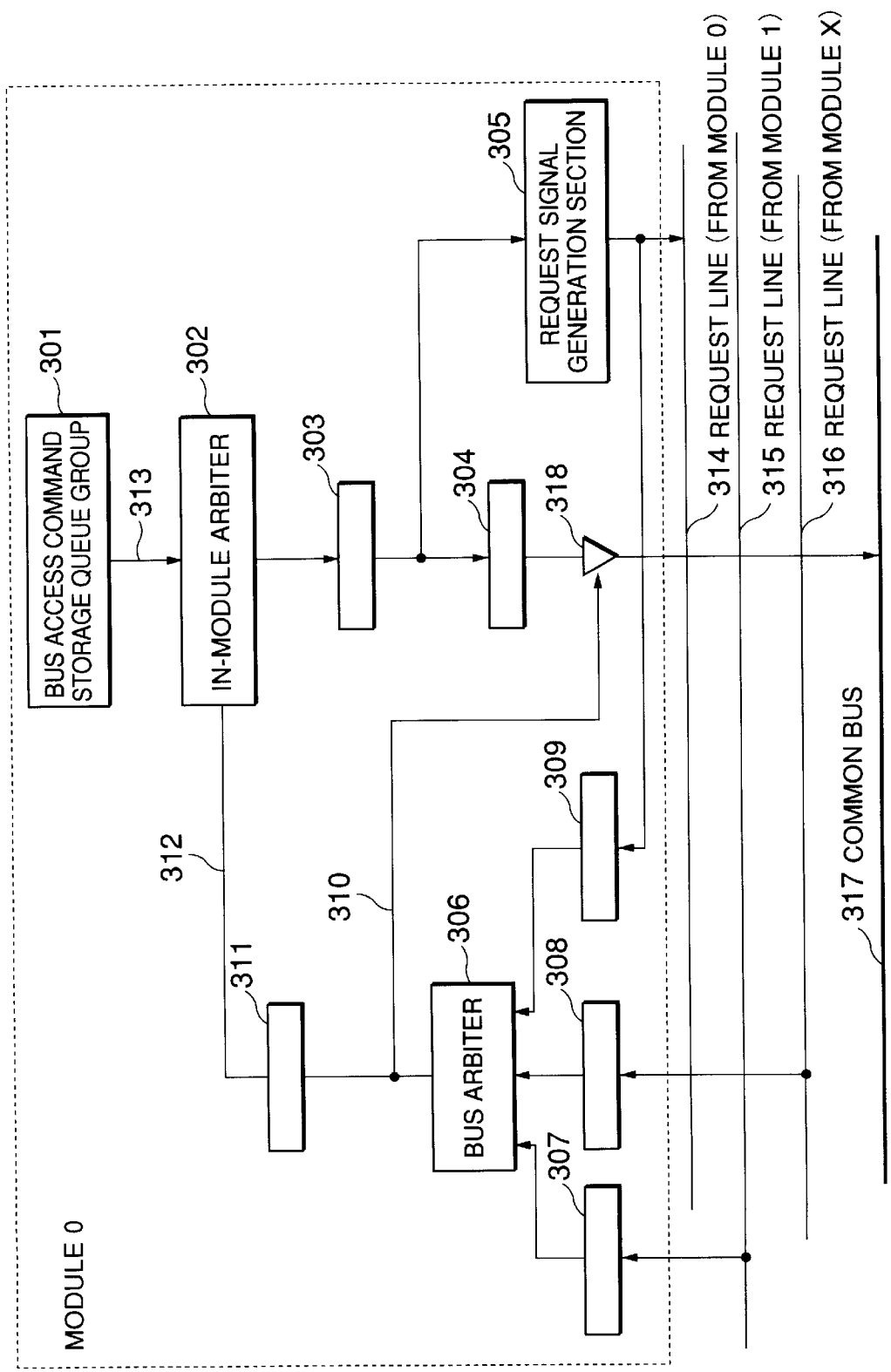
FIG. 4 is a block diagram for illustrating the structure of the prior art relating to arbitration in a module.
Figure 5:
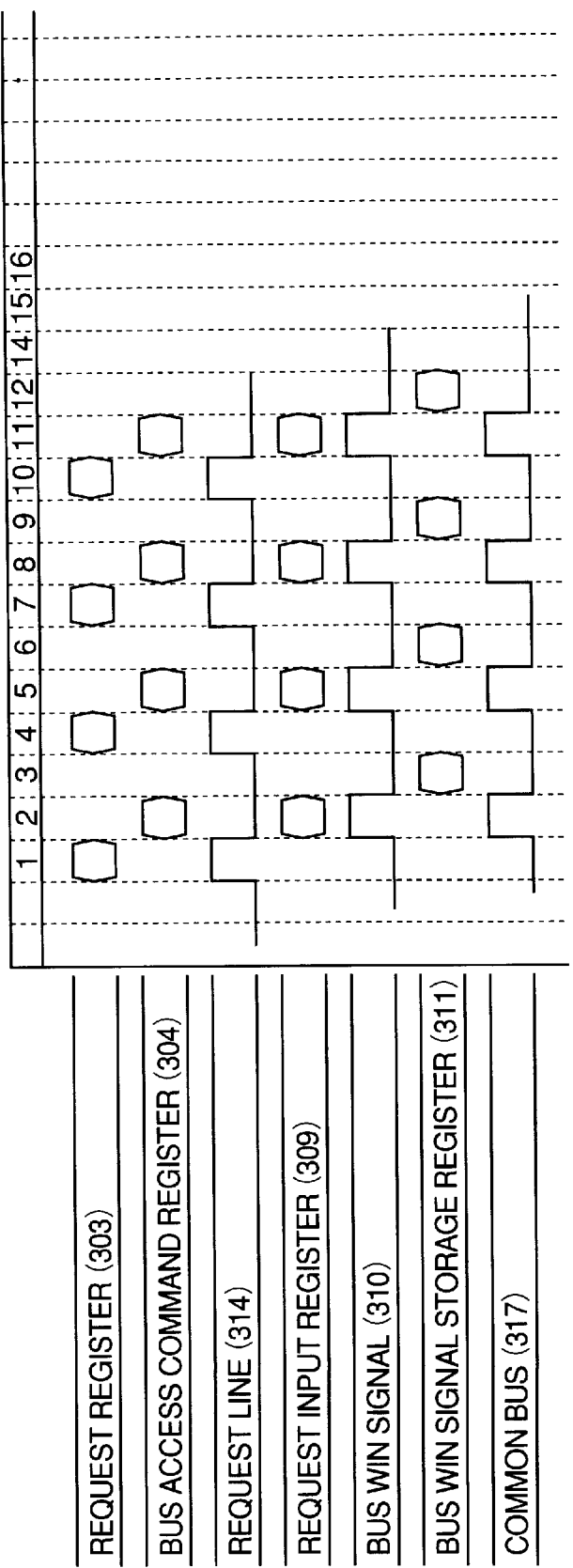
FIG. 5 is a time chart for illustrating the bus condition in the prior art.

FIG. 3 is a time chart used in this embodiment. In the timing 1, the bus access command to be requested is stored in the request register 206, and the request line 106 is asserted. In the timing 2, the requests are stored in the request INPUT registers 209 to 211 in all the modules on the bus, and bus arbitration is performed. The bus WIN signal 215 is used as the output ENB signal from the bus access command register 207 to the common bus 107. In the timing 2, in-module arbitration is performed, and in the timing 3, the result of the in-module arbiter B 204 is stored in the request register 206 if the bus WIN signal is asserted, or, on the other hand, the result of the in-module arbiter A 201 is stored in the request register 206 if the bus WIN signal is not asserted.

As described hereinbefore, by applying the present invention, the number of bus cycles required per one bus access command is reduced, and the bus access command processing capacity of the bus is improved.

What is claimed is:

1. A method for arbitration, in a system having a plurality of modules that are connected to a common bus of a distributed arbitration system, wherein each of the modules perform an issue request to the bus by arbitrating one bus access command out of a plurality of effective bus access commands received from all of the modules, the method comprising the steps of:

a) arbitrating, using both a first arbiter circuit for selecting a first bus access command out of any stored bus access commands for a current bus request cycle in each respective module, and a second arbiter circuit for selecting a second bus access command out of said any stored bus access commands excepting a particular bus access command that the respective module made an issue request for in a most recent bus request cycle;

b) selecting, as a current bus request, the second bus access command selected by said second arbiter circuit if the respective module acquired the bus in the most recent bus request cycle; and c) selecting, as the current bus request, the first bus access command selected by said first arbiter circuit if the respective module did not acquire the bus in the most recent bus request cycle.

2. The method for arbitration as claimed in claim 1, wherein said first arbiter circuit selects the first bus access command which has a highest issue priority out of said any stored bus access commands in the respective module, and said second arbiter circuit selects the second bus access command having a highest issue priority out of said any stored bus access commands excepting the particular bus access command that the respective module made the issue request for in the most recent bus request cycle.

3. The method for arbitration as claimed in claim 1, wherein the step b) and the step c) are performed one bus cycle after the step a) is performed.

4. The method for arbitration as claimed in claim 1, wherein a number of bus cycles between two successive selections for the common bus is two.

5. An apparatus for arbitration in a system having a plurality of modules connected together by a common bus, each module having a first arbiter circuit for selecting a first bus access command out of a plurality of bus access commands in said each module, and a bus arbiter for performing bus arbitration of a distributed arbitration system after inputting the bus requests sent out from each of said modules, said apparatus for arbitration comprising, in said each of said modules:

a second arbiter circuit for selecting a second bus access command out of the plurality of bus access commands excepting a particular bus access command that corresponding module made an issue request for in a most recent bus request cycle;

a selector for inputting a bus WIN signal outputted from said corresponding bus arbiter as a selection control signal, for selecting the second bus access command selected by said second arbiter circuit if said corresponding module acquired the bus in the most recent bus request cycle, and for selecting the first bus access command selected by the said first arbiter circuit if said corresponding module did not acquire the bus in the most recent bus request cycle;

a request register for holding the bus access command determined by said selector; and a request signal generation section for outputting, in a current bus request cycle, the bus access command held in said request register.

6. The apparatus for arbitration as claimed in claim 5, wherein said first arbiter circuit is configured to select the first bus access command which has a highest issue priority out of the bus access commands in said corresponding module, and said second arbiter circuit is configured to select the second bus access command having a highest issue priority out of the bus access commands in said corresponding module excepting the particular bus access command that said corresponding module made an issue request for in the most recent bus request cycle.

7. The apparatus for arbitration as claimed in claim 6, further comprising, in said each of said modules:

a bus access command storage queue group for storing the bus access commands which are candidates for a current bus request; and a request mask section for supplying, to the second bus arbiter circuit, the bus access commands excepting the particular bus access command.

8. The apparatus for arbitration as claimed in claim 7, further comprising, in said each of said modules, a bus access command register for outputting the bus access command held in said request register by outputting a bus WIN signal which indicates that the bus request sent from said corresponding module to the bus is selected.

9. An apparatus for performing arbitration in a system having a plurality of modules connected to each other via a common bus, said apparatus being disposed in each of said modules, said apparatus comprising:

an input arbitration unit for receiving bus requests respectively output for a current bus request cycle by each of said modules, and for determining which of said modules is to be given the common bus based on the received bus requests;

an in-module bus request storage unit for holding future bus requests by said corresponding module;

a first in-module bus arbitration unit for determining which of said future bus requests held in said in-module bus request storage unit has a highest priority; and a second in-module bus arbitration unit connected to said in-module bus request storage unit and said input arbitration unit, said second in-module bus arbitration unit configured to: a) output one of said bus requests having a highest priority as a next bus request signal if said input arbitration unit has determined that the common bus was given to another of said modules in the current bus request cycle, said second in-module bus arbitration unit configured to: b) output said one of said bus requests having the highest priority as the next bus request signal if said input arbitration unit has determined that the common bus was given to the corresponding module in the current bus request cycle and that the received bus request of said corresponding module is different from said one of said bus requests, and said second in-module bus arbitration unit configured to: c) output another of said bus requests having a second highest priority if said input arbitration unit has determined that the common bus was given to the corresponding module in the current bus request cycle and that the received bus request of said corresponding module is the same as said one of said bus requests.

10. The apparatus for arbitration as claimed in claim 9, wherein the received bus requests input to the input arbitration unit are arbitrated based on priority to determine which of said modules is to be given the common bus for the current bus request cycle.

* * * * *